United States Patent Office 3,484,398
Patented Dec. 16, 1969

3,484,398
POWDERED EPOXY RESIN COMPOSITIONS
William I. Childs, Portville, N.Y., assignor to The Dexter Corporation, a corporation of Connecticut
No Drawing. Continuation-in-part of application Ser. No. 440,941, Mar. 18, 1965. This application Oct. 26, 1965, Ser. No. 505,240
Int. Cl. C08g 30/12
U.S. Cl. 260—18                          10 Claims

ABSTRACT OF THE DISCLOSURE

Powdered epoxy resin molding and coating compositions having the combined properties of good shelf life at room temperature and good reactivity at curing temperature, individual particles of said compositions consisting essentially of a fused solid mixture of a normally solid epoxy resin component, tetrachlorophthalic anhydride as a curing component for said resin, filler and modifier components in the proportion of about 0 to 80% and coloring agents in the proportion of about 0 to 5% based on the total weight of the composition, and the proportion of said tetrachlorophthalic anhydride to resin being within the range of about 0.5 to 1.25 anhydride equivalents per 1.0 epoxy equivalent of resin.

As a molding powder the composition should contain catalyst and a mold release agent, and filler components, which may be as high as 80%, are preferably present in the proportion of about 30 to 70% based on the total weight of the composition. Metal stearates e.g. zinc stearate serve the dual function of catalyst and mold release agent.

As a coating powder the particle size should be finer than about 400 microns, and filler components, which may be as high as 50%, are preferably present in the proportion of about 25 to 45% based on the total weight of the composition.

---

In the epoxy resin art, the use of polycarboxylic acid anhydrides as curing agents has been quite extensive in two component systems which require mixing together of resin and curing agent shortly prior to use, and use of the resulting mixture within a limited period of time. Such systems are quite practical for laminating, encapsulating, and related techniques, but are not well suited for molding and powder coating operations.

This application is a continuation-in-part of my pending application Ser. No. 440,941 filed Mar. 18, 1965, now abandoned, directed particularly to molding compositions. For the sake of clarity, the invention will now be described first as applied to molding compositions and then as applied to coating powders.

The term molding, as distinct from liquid casting or potting, involves a one component molding compound, generally solid at room temperature, which under the influence of heat and pressure, will soften and flow into the shape of a mold cavity where it gels or solidifies to a permanent form, as is characteristic with thermosetting resins. The molding techniques generally employed with thermosetting resins include compression molding, wherein the molding compound is placed directly into the mold cavity and is fluidized and forced into the desired shape as the mold closes; and transfer molding, wherein the compound is placed in a separate transfer pot or chamber and a transfer plunger forces it to flow into the mold cavities. The advantages of compression or transfer molding over liquid casting and potting are numerous and include, in particular, much higher production speeds, significantly lower costs, and minimum size variation and enhanced appearance in the resulting molded parts.

A problem in the molding of epoxy resins is that in general, anhydride curing agents are sufficiently reactive with epoxy resins at room temperature that a fused blend of resin and curing agent will undergo inter-reaction and polymerization within very short periods of storage at room temperature. While stability can be enhanced by storing such a blend under refrigerated conditions, this is highly impractical in connection with a molding operation. It is also impractical to pre-mix resin and curing agent just prior to molding, since this introduces problems of non-uniformity in the molding operation, and minimizes the advantages of using a one component system.

Another problem in the molding of epoxy resins has been the relatively long curing time at elevated temperatures necessary to sufficiently cure the resin to permit removal of a molded part from the dies or molds. In order to be practical, a molding compound must be sufficiently fluid under heat and pressure to flow into all mold cavities, but it must also cure sufficiently in a period of less than 5 minutes at 250–350° F., so that a molded part will hold its shape and integrity as the molded parts are removed. In fact, the 5 minute cure limit is an outside limit, and to be commercially practical, the molding cycle or cure period should usually be a 1 to 3 minute, or shorter cycle.

The combined requirements of non-reactivity at room temperature and rapid cure at elevated (250–350° F.) temperature have heretofore presented practical problems of such magnitude that there has been little progress with the molding of anhydride cured epoxy resins. At the same time, there has been a recognized need for improvement in this area in view of the desirable properties that can be achieved with anhydride cured epoxy resins.

It has now been found, in accordance with the present invention, that the problems above mentioned can be overcome, and commercially practical anhydride cured epoxy molding compositions can be readily prepared by employing as the curing agent, tetrachlorophthalic anhydride. A considerable number of anhydrides have been tested and tetrachlorophthalic anhydride is unique in providing in epoxy molding compositions, a combination of good shelf stability at room temperature, fast cure at molding temperature, good molding properties, and excellent physical properties in the molded articles.

The unique activity of tetrachlorophthalic anhydride in molding compositions applies to epoxy resins, and mixtures of epoxy resins generally, provided they are physically suited for molding, i.e. solid at room temperature, but having a softening point sufficiently below the molding temperature of 250 to 350° F. to be fluid in the molding operation. Preferred resins are the normally solid bisphenol based and epoxy novolac resins and mixtures thereof, including mixtures of solid and liquid resins which are solid at room temperature. Such mixtures can also include a solid bisphenol based, or epoxy novolac resin with another type of liquid epoxy resin, such as a liquid cyclohexene oxide type resin.

Epoxy resins made by reaction of alkylidene bisphenols, such as Bisphenol A, Bisphenol B, and the like, with epichlorohydrin are well known in the art. They have a functionality (average number of epoxide groups per molecule) in excess of 1, and generally about 1.6 to 2. They vary considerably in molecular weight and softening point, and for the purpose of the present invention, these resins, having molecular weights within the range of about 400 to 5000, and a softening point within the range of about 10 to 135° C., can be effectively used.

Epoxy novolac resins are also well known in the art and commercially available. Their preparation by reaction of epichlorohydrin with phenol-formaldehyde or cresol-formaldehyde resins containing reactive —OH groups, is disclosed in U.S. Patent No. 2,658,885. These resins have a functionality greater than 2, and frequently as high as 6 to 7. For the purpose of the present invention, the novolac based epoxy resins should have a molecular weight within the range of about 500 to 1500, and a functionality of about 4 to 7, and further, should have a softening point within the range of about 30 to 120° C.

The more recently available cyclohexene oxide type resins are prepared by epoxidizing dicyclohexene ester derivatives with peracetic acid as disclosed in U.S. Patent No. 2,716,123. These resins, which are also known commercially as cycloaliphatic or peracetic resins, have a molecular weight in excess of about 275 and a functionality of 2.

In addition to the resin, or resin mixture and the tetrachlorophthalic anhydride, which should be present in the proportions of 0.5 to 1.25 anhydride equivalents per 1.0 epoxy equivalents of epoxy resin, the new compositions should contain a small amount of a zinc or calcium salt, or a tertiary amine or other known epoxy/anhydride catalyst as a means for effecting a sufficiently fast cure for practical molding. When a salt of a fatty acid, such as zinc stearate or calcium stearate is used as a catalyst, it serves the further function of acting as a mold release agent. This can be supplemented, however, with a wax or other commonly used release agent. The amount of catalyst can vary from about 0.05 to 5.0% by weight based on the total composition, and preferably about 0.10 to 1.50%. The amount of supplemental release agent, if present, should be about 0.05 to 5.0%, and preferably 0.10 to 2.0% by weight.

In addition to these components, conventional filler and modifier components can be added to give special properties. Almost all molding compositions contain an inert filler. This is usually a finely ground material such as silica, talc, calcium carbonate, clay, non-active organic materials, or combinations thereof, and is used to lower cost, control flow, improve thermal conductivity, and for other special purposes, for example, the use of fibrous fillers to improve toughness and impact strength. The preferred fillers for general use in these compositions comprise these above mentioned materials that have been ground so that substantially all the particles are finer than 200 mesh, and in many cases finer than 325 mesh. If strength improvement is desired, fibrous fillers such as fiber glass, asbestos, or organic fibers can be incorporated. Modifiers can be added for special purposes such as the inclusion of antimony oxide and a halogen containing material to impart improved flame resistance, or the inclusion of a minor amount of a polyol to plasticize or flexibilize the resin. The quantity of filler and modifier components used can vary from 0 to about 80% by weight, but the preferred range is 30–70% by weight.

In addition, pigments or dyes can be incorporated to produce special colors. These pigments are incorporated in relatively small quantities, usually from 0.10 to 5.0% by weight. The only limitations are that they should be essentially non-reactive in the system and should be color stable at normal molding temperatures of up to about 350° F. Typical pigments are titanium dioxide white, phthalocyanine blues and greens, carbon black and iron oxide blacks, iron oxide and mercury-cadmium reds and yellows.

The new compositions can be mixed in several ways. The curing agent, epoxy resin, catalyst, release agent, fillers, pigments, etc., can be ground to a fine powder and then blended homogeneously. This method usually produces compositions that do not perform as satisfactorily for molding as do compositions wherein the components are intimately mixed by hot melt blending, 2-roll milling, extrusion or other similar mixing process. In hot melt processing, the components are heated separately to a sufficiently high temperature that the resin has a viscosity that will allow the other powdered components to be stirred in. The mixture is then cooled and solidifies and can be crushed for use. Alternatively, the compositions can be made by hot compounding on a differential speed 2-roll mill or an extruder. In any of these hot compounding procedures, the tetrachlorophthalic anhydride is added at a temperature not exceeding 250° F., and preferably below 225° F., and the mixture is generally cooled as soon as uniform blending is achieved to minimize reaction with the resin. In some instances, however, the blending at a temperature below about 225° F. may be continued for a controlled period of time before cooling to effect a partial pre-cure or "B-staging" as a further means for providing the desired short cure time at molding temperature. When blending on a 2-roll mill, the blending temperature should not exceed 220–230° F. as higher temperatures will be detrimental to the shelf stability of the composition.

It is well known when using anhydride hardeners that physical properties of the cured resin can, to a considerable extent, be predetermined by selecting a hardener of particular structure. In the new compositions, it is possible to add small amounts of other anhydrides, i.e. up to about 10 to 15% of the weight of tetrachlorophthalic anhydride, without too greatly impairing the advantages of good shelf life and rapid cure at molding temperature provided by the tetrachlorophthalic anhydride.

A practical means for evaluating both shelf life and suitability for various molding uses is the so-called "spiral flow test" which is described in an article entitled "Spiral Mold for Thermosets" by F. Karras, Modern Plastics, September 1963. The compositions of the present invention have been evaluated by such a test using a ⅛" diameter half round spiral to which molding composition or compound is fed through a gate 300 ±5° F. with a pressure of 500 p.s.i., calculated on the plunger area. The distance the compound flows into this spiral is measured in inches. This distance or inches of flow is determined principally by the melted viscosity of the compound and the speed of its gelation. The lower the viscosity and the longer the gelation time, the longer the spiral flow will be—other conditions being equal. A spiral flow of X inches can be obtained by using a low viscosity compound that gels quickly, or a higher viscosity compound that does not gel as quickly and thus flows more slowly but for a longer period of time.

For any one compound or similar compounds, spiral flow offers a convenient method of measuring changes in the material during storage. To the extent that the compound reacts during room temperature storage, the spiral flow will decrease and, eventually, the flow will decrease to the point that the compound cannot be molded satisfactorily.

Molding conditions, and particularly the mold cavities to be encountered, will, of course, vary widely. With some simple molds, a relatively stiff molding composition can be employed, i.e. one having a short spiral flow. For multiple or large cavity molds, on the other hand, the composition should be one having a long spiral flow. Thus, the spiral flow measurement is helpful in selecting the proper composition for a particular molding job.

The following examples will provide a clearer understanding of the new epoxy molding compositions, and the unusual effectiveness of the tetrachlorophthalic anhydride as a hardener, but it is to be understood that these examples are given by way of illustration and not of limitation, In order to simplify the examples, the resins will be identified by code letters, having reference to the following tabulation:

TABLE I

| Resin | Type | Softening point (° C.) | Equivalent weight | Functionality |
|---|---|---|---|---|
| A | Bisphenol A | 75–85 | 550–650 | 1.8–1.9 |
| B | do | 95–105 | 825–1,025 | 1.7–1.8 |
| C | do | 95–105 | 860–1,015 | 1.7–1.8 |
| D | do | 127–133 | 1,600–2,000 | 1.6–1.7 |
| E | Epoxy novolac | 85–100 | 1,920–220 | 6–7 |
| F | do | 80–90 | 220–235 | 4–5 |
| G | Bisphenol A | 20–28 | 235–275 | 1.9–2.0 |
| H | Cyclohexene oxide [1] | Liquid | 135–150 | 2 |

[1] EP-201 (Union Carbide Chemical Company).

In the foregoing tabulation, equivalent weight defines the number of grams of resin required to provide 1.0 chemical equivalents of epoxy groups. Functionality is the average number of epoxy groups per each molecule of resin.

Also for simplicity in the examples, certain of the anhydrides used may be identified by code designation as follows:

TCPA=tetrachlorophthalic anhydride
HET=hexachloroendomenthyltetrachlorophthalic anhydride
BPD=benzophenone dianhydride
THPA=tetrahydrophthalic anhydride.

EXAMPLE I

Four resin compositions were prepared using as components:

| Component: | Parts by wt. |
|---|---|
| Resin A | 15.77 |
| Resin C | 7.88 |
| Silica, —325 mesh | 66.50 |
| Zinc stearate | 1.00 |
| Carbon black pigment | 0.75 |
| Anhydride, stoichiometrically equivalent amounts as noted below [1] | |

[1] (a) 8.10 parts by weight of TCPA, (b) 10.5 parts by weight of HET, (c) 4.50 parts by weight of BPD, (d) 4.25 parts by weight of THPA.

The resins were ground to be substantially all finer than 20 mesh and were blended and compounded with the other components on a hot 2-roll plastics mill. The anhydride was ground finer than —100 mesh. The composition was removed from the mill as soon as uniform blending was achieved, cooled to room temperature, and then broken to small granules for molding evaluation. The molding characteristics with the different anhydrides were as follows:

(a) The composition containing 8.10 parts by weight of TCPA had a spiral flow of 19 inches. After molding for 2 minutes at 300° F., the composition could be easily removed from the mold, and had sufficient strength to retain its molded shape.

(b) The composition containing 10.5 parts by weight of HET had a spiral flow of 20.5 inches. After molding for 3.5 minutes at 300° F., the material was still soft and flabby, and did not retain its molded shape well. HET is reported in the literature to be a fast reacting anhydride curing agent giving products of high heat distortion, yet it is definitely inferior to TCPA in this type of formulation.

(c) The composition containing 4.50 parts by weight of BPD had a spiral flow of approximately 17 inches. After 5 minutes molding at 300° F., the material remained soft and punky. It stuck badly to the mold surfaces, and could not be removed from the mold in one piece. BPD, because it is a dianhydride, has been reported in the literature to be fast reacting and to give cured compositions of high heat distortion and hardness, yet in this type of formulation, it performs very poorly.

(d) The composition containing 4.25 parts by weight of THPA had a spiral flow of about 50 inches. At the 300° F. molding temperature, it took more than 10 minutes to gel; and even then was very punky, and could not be removed from the mold in one piece.

EXAMPLE II

A molding composition was prepared containing:

| Component: | Parts by wt. |
|---|---|
| Resin A | 15.77 |
| Resin C | 7.88 |
| Silica, —325 mesh | 67.00 |
| Zinc stearate | 0.50 |
| Carbon black pigment | 0.75 |
| TCPA, —100 mesh | 8.10 |

This composition, which differs from Example 1a only in having a smaller amount of zinc stearate catalyst (and mold release agent) and a slight increase in the amount of silica was compounded on a 2-roll plastics mill as described in Example I.

This composition was molded for 2 minutes at 300° F. and had a spiral flow of 18.0 inches, and showed good molding properties, releasing readily from the mold in spite of the smaller proportion of zinc stearate present. The heat distortion temperature (ASTM-D 648–56) was measured to be 104° C.

After storage for one month at room temperature the composition, upon retesting, again showed a spiral flow of 18.0 inches, indicating excellent shelf stability.

EXAMPLE III

A composition was prepared similar to that in Example II, but substituting 19.90 parts by weight of Resin D and 3.75 parts by weight of Resin G for Resins A and C. The solid and liquid resins were first blended by hot melt and then blended with other components on a hot 2-roll plastics mill. The resulting composition was molded for 2 minutes at 300° F. and had a spiral flow of 7–8 inches, and very good molding properties, releasing well from the mold, and was very hard and tough when cooled to room temperature.

EXAMPLE IV

The procedure of Example III was repeated using 20.50 parts by weight of Resin D, but combining this by hot melt with 3.15 parts by weight of Resin H (instead of the Resin G of Example III). The resulting composition had a spiral flow of 4 inches, and very good molding properties, as in Example III, with a cure of 2 minutes at 300° F.

EXAMPLE V

Following the procedure of Example II, a molding composition was prepared containing:

| Component: | Parts by wt. |
|---|---|
| Resin E | 5.00 |
| Resin C | 15.00 |
| Silica, —325 mesh | 68.90 |
| Zinc stearate | 1.00 |
| TCPA, —100 mesh | 9.25 |
| Carbon black pigment | 0.85 |

This comopsition molded well when cured for 1½ minutes at 300° F., and had a spiral flow of 3.9 inches. A sample stored for one month at 100° F. had a spiral flow of 1.0 inch. Since one month storage at 100° F. is comparable to about six months storage at room temperature, this is indicative of good shelf stability.

EXAMPLE VI

Following the procedure of Example II, a molding composition was prepared containing:

| Component: | Parts by wt. |
|---|---|
| Resin A | 15.77 |
| Resin C | 7.88 |
| Silica, —325 mesh | 67.40 |
| Zinc stearate | 1.00 |
| Carbon black pigment | 0.85 |
| TCPA, —100 mesh | 6.10 |
| BPD, —100 mesh | 1.00 |

This composition molded well at 300° F., and had a spiral flow of 17.9 inches. After storage for two months at 70–80° F., the spiral flow dropped only to 15.3 inches, indicating good shelf stability. The second curing agent has apparently not detracted from the good characteristics imparted by the TCPA. After a cure of 2 minutes at 300° F. the molded part released easily from the mold and retained its shape, and was hard and tough when cool.

EXAMPLE VII

Following the procedure of Example II, a molding composition was prepared containing:

| Component: | Parts by wt. |
|---|---|
| Resin A | 15.77 |
| Resin C | 7.88 |
| Silica, —325 mesh | 67.20 |
| Zinc stearate | 1.00 |
| TCPA, —100 mesh | 6.48 |
| Phthalic anhydride, —100 mesh | 0.82 |
| Carbon black pigment | 0.85 |

This composition showed an initial spiral flow of 28.9 inches, and after one month storage at 70–80° F., a spiral flow of 23.7 inches, indicating good shelf stability. The composition had good molding properties setting to tough, easily removed molded bodies in 2½ minutes at 300° F. Here again the second curing agent present has not detracted from the properties imparted by the TCPA.

EXAMPLE VIII

Following the procedure of Example II, a molding composition was prepared containing:

| Component: | Parts by wt. |
|---|---|
| Resin F | 11.60 |
| Resin C | 6.00 |
| Silica, —325 mesh | 67.00 |
| Calcium stearate | 0.50 |
| Wax | 0.75 |
| TCPA | 13.30 |
| Carbon black pigment | 0.85 |

In this composition the wax, glycerol monostearate, was added as a supplemental mold release agent.

The composition molded well in 2 minutes at 300° F., and had a spiral flow of 1 inch. The molded parts were hard and tough.

An identical composition, but for the replacement of 0.5 part by weight of calcium stearate with 0.5 part by weight of zinc stearate molded almost identically with a spiral flow of 1 inch.

It is evident from the foregoing examples that the TCPA curing agent provides the unique combination of good shelf stability, fast cure at molding temperature, and good toughness and molding properties with a wide variety of epoxy resins and resin mixtures. As earlier mentioned, the differences in spiral flow which characterize different compositions should be taken into account when selecting a molding compound for a particular molding job. In general, the more intricate, and the greater the number of cavities in the mold, the greater the spiral flow desired in the composition.

It will, of course, be recognized that unlike items molded from thermoplastic resins, items molded from the thermosetting epoxy resins are heat-cured in order to develop the optimum properties of toughness, hardness, tensile strength, etc. in the molded parts. The few minutes in the molding press may be sufficient cure for many applications, but in some cases, additional cure may be desirable. Such post-curing can be effected in conventional ovens for periods of up to 2 hours at 250–350° F. if required.

The compositions herein described have been found particularly useful in molding electrical components, such as capacitors, resistors, and coils. They are also useful in the molding of structural items generally when the physical and chemical resistance properties characteristic of epoxy resins are desired.

In adapting the invention to epoxy resin compositions for use as coating powders, many of the molding compositions above described could be utilized with minor changes. For one thing, powders for coating application by fluidized bed, spraying or elestrostatic methods should have a particle size finer than about 400 microns, and preferably fine enough to pass through a 60 mesh sieve.

The resin, or resin mixtures employed should preferably have a softening point above about 65° C., and suitably in the range of 65° to 150° C. The lower limit of this range is significant to provide compositions in which the finely divided powder will not tend to fuse or pack together under normal storage conditions in which temperatures may reach as high as 100° F. The upper limit of this range is not a well defined limit, but can vary considerably with variations in the cure conditions and nature of substrates being coated. The important factor is that the resin at the coating and cure temperature should melt and flow out in a smooth coating; and resins or resin mixtures having a softening point somewhat in excess of 150° C. could be used in instances where substrates can stand a coating and cure temperature of 400° F. or higher. Individual components of resin blend can, of course, have a softening point outside the range above mentioned. Thus, for example, any of the resins identified in Table I can be used in coating compostions by suitably blending resins of low softening point with others of high softening point.

As in the case of the molding compounds, compostions for use as coating powders may be catalyzed with known epoxide-anhydride catalysts, such as amines (especially tertiary amines) Lewis acids and metal salts. The amount of catalyst, if present, can vary from about 0.01 to 3.0% based on the weight of the composition, depending upon the degree of acceleration of cure desired. Typical catalysts for use in coating compositions include zinc acetate, nickel acetate, stannous octoate, cobalt acetate, and potassium fluoroborate. In coating compositions adhesion to the substrate is generally of primary importance. Thus, catalysts in the form of fatty-acid salts such as zinc stearate (used as combined catalyst and mold release agent in molding compounds) should be avoided, except in those special instances where it may be desired to strip a coating from the substrate.

Another area in which the molding and coating compositions are generally similar, but differ somewhat in the practical limits, is the amount of filler present. Whereas molding compounds may continue as much as 80% by weight of filler, and preferably about 30 to 70% by weight; the amount of filler in coating compositions should not exceed about 50% by weight, and is preferably in the range of about 25 to 45% by weight.

Fillers and pigments or coloring agents as previously described in connection with molding compounds are also suited for use in coating compositions. Particle size of fillers should preferably be finer than about 50 microns, i.e. passing through a 200 mesh sieve. In selecting pigments and fillers, a factor which must be considered is their stability under curing conditions, which may involve heating to as high as 450° F. for 10 to 30 minutes.

As in the case of molding compounds, the amount of tetrachlorophthalic anhydride (TCPA) in coating compositions should be within the range of about 0.5 to 1.25 equivalents per 1.0 epoxy equivalent, although there is little advantage in exceeding the 1:1 anhydride equivalent:epoxy equivalent ratio.

The unique room temperature stability of resin-anhydride mixtures containing TCPA is realized not only in systems containing TCPA as the only curing agent, but also in systems containing substantial amounts of other anhydride or acid curing agents. In such instances, however, TCPA should comprise at least 25 to 30% of the combined curing agents. In general, such supplementary curing agents are used for specific desired modifications of a coating. For example, azelaic acid has the known capacity to impart flexibility and toughness to epoxy coatings.

Evaluation of epoxy coating compositions by any single set of standards is impossible, since the properties which are most desired will differ from one end use to another. Probably the most useful test for both general evaluation and comparison for specific purposes is an impact resistance test using a Gardner impact tester. This apparatus, made by Gardner Laboratories, Bethesda, Maryland, drops weights from different heights to an anvil on which is placed a coated substrate, usually a steel strip measuring 1" x 5" x 0.060" to which a coating has been applied and cured. Readings are a multiple of the weight times the drop distance in inches; thus, a four pound weight dropped 10 inches provides a reading of 40 inch-pounds. The weight and/or height of drop is gradually increased to determine the maximum inch-pounds the coating will withstand without cracking. A coating that withstands 120 inch-pounds, but cracks at 130-inch-pounds, has an impact strength of 120 inch-pounds. Impact resistance is also useful as a measure of cure for a particular coating. Uncured coatings have a lower impact strength, and with samples cured for different times, the point of complete cure can be determined as the point where impact strength stops changing.

In the coating of heated substrates with the powdered TCPA-epoxy resin compositions by fluidized bed, dry spray, electrostatic spray and related techniques, important properties of the coating include smoothness, continuity or freedom from pinholes, and freedom from sag or drip-off. These properties can be modified extensively by resin selection, the type and amount of catalyst, and the type and amount of filler; but they are also influenced by the type and heat retention of the substrate being coated. The substrate is, of course, pre-heated to coating temperature, which may be 300 to 400° F. to melt and adhere the contacting powder, and it will be apparent that a given powdered coating composition may behave satisfactorily with substrates having one rate of heat dissipation, and less satisfactorily for substrates having substantially faster or slower heat dissipation. For example, if heat is dissipated too fast to provide a smooth coating, the problem may be solved by supplemental heat curing, or by employing resin having a lower softening point. On the other hand, if the problem is one of too much heat retention in the substrate, leading to sag or drip-off, the addition of catalyst to shorten the cure time, or the use of resin having a higher melting point may lead to better results. Such changes in adapting the coating compositions to particular uses in no way impair or detract from the combined advantages of room temperature stability and rapid cure at moderately elevated temperatures imparted by the TCPA as curing agent in the compositions.

The following examples show a number of typical coating compositions in accordance with the present invention, but it is to be understood that these examples are given by way of illustration and not of limitation.

EXAMPLE IX

A coating composition was prepared containing:

| Component: | Parts by wt. |
| --- | --- |
| Resin B | 45.0 |
| Silica —325 mesh | 43.1 |
| Red iron oxide | 0.5 |
| TCPA | 11.4 |

The resin and TCPA, ground to be substantially finer than 20 mesh were blended with the other components for about 30 minutes in a mixing drum and then compounded on a hot differential 2-roll mill to a homogeneous mixture. After cooling the compound was ground to particles substantially finer than 60 mesh (about 250 microns) forming a powder suitable for fluidized bed, dry spray, or electrostatic spray application to heated substrates. For test purposes 1" x 5" x 0.060" cold-rolled steel strips, preheated to 400° F. were coated by dipping in a fluidized bed of the compound followed by a 20 minute cure at 400° F., providing smooth, level coatings about 17 mils thick. The coated strips showed an impact strength of 80 inch-pounds.

A sample of the powder in a closed container stored for two months at 100° F. showed no change in coating characteristics, or in the physical properties of the resulting coatings. Another sample stored for several months in an open container in an atmosphere averaging 95% relative humidity and about 73° F. showed no signs of caking of the powder, and the good coating characteristics were maintained.

EXAMPLE X

Following the procedure of Example IX, a powdered coating composition was prepared containing:

| Component: | Parts by wt. |
| --- | --- |
| Resin A | 25.0 |
| Resin B | 25.0 |
| Silica —325 mesh | 34.0 |
| TCPA | 15.8 |
| Red iron oxide | 0.2 |

Test strips coated with this powder at 400° F. and cured for 20 minutes at 400° F. had smooth, level and continuous coatings with an impact strength of 110 inch-pounds. As in Example IX, samples stored at elevated temperature (100° F.) for two months and exposed to atmospheric conditions for several months, showed no change in properties of the powder, or of coatings made therefrom.

EXAMPLE XI

Following the procedure of Example IX, a powdered coating composition was prepared containing:

| Component: | Parts by wt. |
| --- | --- |
| Resin B | 43.0 |
| Silica —325 mesh | 43.1 |
| TCPA | 11.4 |
| Red iron oxide | 0.5 |
| Polyethylene glycol (4000 mol wt.) | 2.0 |

Coatings of this composition applied and cured for 20 minutes at 400° F. and an impact strength of 150 inch-pounds. As compared with Example IX, it will be noted that the small amount of polyethylene glycol has provided improved toughness.

EXAMPLE XII

Following the procedure of Example IX, a powdered coating composition was prepared containing:

| Component: | Parts by wt. |
| --- | --- |
| Resin A | 22.50 |
| Resin D | 22.50 |
| Silica —325 mesh | 38.35 |
| Talc —325 mesh | 5.00 |
| TCPA | 11.40 |
| Phthalocyanine blue pigment | 0.25 |

Test strips coated with this composition after 10 minute cure at 400° F. had an impact strength of 150 inch-pounds, and the coatings were smooth and continuous.

EXAMPLE XIII

Following the procedure of Example IX a powdered coating composition was prepared containing:

| Component: | Parts by wt. |
|---|---|
| Resin B | 45.0 |
| Silica —325 mesh | 40.7 |
| TCPA | 14.3 |

In this composition the amount of TCPA is 1.0 equivalent per epoxy equivalent. Test strips coated and cured for 20 minutes at 400° F. had an impact strength of 110 inch-pounds.

EXAMPLE XIV

Following the procedure of Example IX a powdered coating composition was prepared containing:

| Component: | Parts by wt. |
|---|---|
| Resin A | 22.50 |
| Resin D | 22.50 |
| Silica —325 mesh | 45.38 |
| Red iron oxide | 0.50 |
| TCPA | 9.12 |

In this composition the amount of TCPA is about 0.65 equivalents per epoxy equivalent. Coatings cured for 20 minutes at 400° F. had an impact strength of 160 inch-pounds.

EXAMPLE XV

Following the procedure of Example IX a powdered coating composition was prepared containing:

| Component: | Parts by wt. |
|---|---|
| Resin A | 40.0 |
| Resin D | 13.0 |
| TCPA | 17.4 |
| Silica —325 mesh | 20.0 |
| Talc —325 mesh | 5.0 |
| Carbon black | 0.5 |
| Tetrahydrophthalic anhydride | 3.6 |
| Zinc acetate | 0.5 |

This powder, applied at 400° F. to test strips cured in about 5 minutes to a smooth, continuous coating having an impact strength of 40 inch-pounds.

EXAMPLE XVI

Following the procedure of Example IX a powdered coating composition was prepared containing:

| Component: | Parts by wt. |
|---|---|
| Resin B | 43.80 |
| Resin F | 6.25 |
| Silica —325 mesh | 30.03 |
| Red iron oxide | 0.50 |
| Antimony trioxide —325 mesh | 10.00 |
| TCPA | 3.52 |
| Azelaic acid | 5.90 |

This powder, applied to test strips and cured for 20 minutes at 400° F., produced smooth, continuous coatings having an impact strength of 80 inch-pounds.

EXAMPLE XVII

Following the procedure of Example IX, a powdered coating composition was prepared containing:

| Component: | Parts by wt. |
|---|---|
| Resin A | 21.8 |
| Resin D | 21.8 |
| Resin F | 3.0 |
| TCPA | 14.5 |
| Silica —325 mesh | 38.4 |
| Red iron oxide | 0.5 |

This powder, applied to test strips and cured for 20 minutes at 400° F., provided smooth, continuous coatings having an impact strength of 90 inch-pounds.

EXAMPLE XVIII

Following the procedure of Example IX a powdered coating composition was prepared containing:

| Component: | Parts by wt. |
|---|---|
| Resin A | 21.8 |
| Resin D | 21.8 |
| TCPA | 11.4 |
| Silica —325 mesh | 39.1 |
| Clay —325 mesh | 5.0 |
| Red iron oxide | 0.5 |
| Cobalt acetate | 0.4 |

This powder, applied to test strips and cured for two minutes at 400° F., provided coatings with an impact strength of 140 inch-pounds. A three minute cure at 400° F. increased the impact strength to 160 inch-pounds. In spite of the greater reactivity at curing temperature due to the catalyst present, this powder is extremely stable and showed no change in coating characteristics after storage at room temperature for three months.

EXAMPLE XIX

Following the precedure of Example IX a powdered coating composition was prepared which was identical with the composition of Example XVIII, except that the 0.4 part of cobalt acetate was replaced by 0.4 part of potassium fluoborate as catalyst. This powder applied to test strips and cured at 400° F., some for 3 minutes and some for 4 minutes, provided smooth, level and continuous coatings with impact strength of 80 inch-pounds and 120 inch-pounds respectively.

In Examples IX to XIX the curing has been effected at 400° F. which is practical with most metal and other durable substrates. With some substrates, however, there may be insufficient heat retention to fuse the contacting powders of the foregoing examples, or the substrate may be damaged by heating to temperatures of 400° F. It is possible by selecting resins having a suitably low softening point to offset these problems and provide powders which can be applied to substrates and cured at temperatures of 300° F. or even 250° F. The limiting factor in moving to resins with lower softening point is that the powder must be non-reactive and free-flowing under normal storage conditions. This lower limit of resin softening point is about 65–70° C., in which event, a powder formed with such resin can be applied by the techniques above mentioned at temperatures of about 250° F. and higher.

The following examples are illustrative of practical coating compositions for low temperature application and cure:

EXAMPLE XX

Following the procedure of Example IX a powdered coating composition was prepared containing:

| Component: | Parts by wt. |
|---|---|
| Resin A | 30.0 |
| Resin D | 10.0 |
| TCPA | 12.7 |
| Silica —325 mesh | 46.8 |
| Red iron oxide | 0.5 |

This powder was deposited from a fluidized bed on test strips pre-heated to 300° F. After a 2 hour cure at 300° F., the coatings were smooth and continuous and showed an impact strength of 140 inch-pounds.

EXAMPLE XXI

A powdered coating composition was prepared containing:

| Component: | Parts by wt. |
|---|---|
| Resin A | 40.0 |
| Resin D | 13.0 |
| TCPA | 17.4 |
| Silica —325 mesh | 22.8 |
| Clay —325 mesh | 6.0 |
| Red iron oxide | 0.5 |
| Zinc acetate | 0.5 |

The resins were first melted together at about 150° C. and then cooled, ground to finer than 20 mesh and combined with the other components in the manner described in Example IX. The resulting powder was applied to test strips pre-heated to 300° F. and cured for 2 hours at 300° F. forming smooth, continuous coatings having an impact strength of 50 inch-pounds.

Various changes and modifications in the epoxy molding and coating compositions herein disclosed will occur to those skilled in the art, and to the extent that such changes and modifications are embraced by the appended claims, they constitute part of the present invention.

I claim:

1. A particulate epoxy resin composition having the combined properties of good shelf life at room temperature and good reactivity at curing temperature, individual particles of said composition consisting of a fused solid mixture of a normally solid epoxy resin component tetrachlorophthalic anhydride as curing components for said resin, filler and modifier components in the amount of 0 to 80% by weight of said composition, coloring agents in the amount of 0 to 5% by weight of said composition, the proportion of said tetrachlorophthalic anhydride to resin being within the range of 0.5 to 1.25 anhydride equivalents per epoxy equivalent of said epoxy resin, and said epoxy resin component being selected from the group consisting of alkylidine bisphenol resins having a molecular weight of from 400 to 5,000 and a softening point from 10° C. to 135° C.; an epoxy novolac resin having a molecular weight of 500 to 1,500 and softening point of 30° C. to 120° C.; a cyclohexene oxide resin having a molecular weight greater than 275, and mixtures thereof, including mixtures of normally solid resins and solid mixtures of normally solid and normally liquid resins.

2. A particulate epoxy resin composition according to claim 1, in which said suspension also comprises an amount of catalyst for the epoxy-anhydride reaction not exceeding 5% by weight of said composition.

3. A particulate epoxy resin composition according to claim 1, in which a portion not greater than 75% by weight of the tetrachlorophthalic anhydride is replaced by a supplemental component selected from the group consisting of carboxylic acid and anhydride epoxy curing agents.

4. A particulate epoxy resin molding composition according to claim 1 or 2 in which the filler and modifier components comprise 30 to 70% by weight of said composition.

5. A particulate epoxy resin molding composition according to claim 1, in which catalyst is present in the amount of 0.10 to 1.5% by weight of said composition, and may include a metal stearate also functioning as a mold release agent.

6. A particulate epoxy resin molding composition according to claim 1; in which a supplemental mold release agent is present in the amount of 0.5% to 5.0% by weight of said composition.

7. A particulate epoxy resin molding composition according to claim 1, in which an amount not greater than 15% by weight of the tetrachlorophthalic anhydride is replaced by another carboxylic acid anhydride compound capable of curing epoxy resins.

8. A particulate epoxy resin coating composition according to claim 1 in which said composition has a particle size finer than 400 microns, the filler and modifier components comprise not more than 50% by weight of said composition, and the catalyst does not exceed 3% by weight of said composition.

9. A particulate epoxys resin coating composition according to claim 1, in which the filler and modifier components comprise 25% to 45% by weight of said composition.

10. A particulate epoxy resin coating composition according to claim 1, in which catalyst is present in the amount of 0.01 to 3% by weight of said composition.

References Cited

UNITED STATES PATENTS

| | | | |
|---|---|---|---|
| 3,388,185 | 6/1968 | Goldberg et al. | 260—78.4 X |
| 3,344,096 | 9/1967 | Manasia et al. | 260—78.4 X |
| 3,336,251 | 8/1967 | Manasia | 260—78.4 X |
| 3,269,975 | 8/1966 | Lee | 260—37 |
| 3,269,974 | 8/1966 | Childs | 260—37 |
| 3,201,360 | 8/1965 | Proops et al. | 260—18 |
| 3,170,890 | 2/1965 | Boyd et al. | 260—37 |
| 3,144,421 | 8/1964 | Yost | 260—37 |
| 3,117,099 | 1/1964 | Proops et al. | 260—18 |
| 3,102,043 | 8/1963 | Winthrop et al. | 260—47 |
| 3,039,987 | 5/1962 | Elbling | 260—47 |
| 3,025,263 | 3/1962 | Lee et al. | 260—47 |
| 2,890,195 | 6/1959 | Phillips et al. | 260—47 |
| 2,934,520 | 4/1960 | Mayurmk | 260—47 |
| 2,801,229 | 7/1957 | DeHoff et al. | 260—33.6 |

FOREIGN PATENTS

| | | |
|---|---|---|
| 903,933 | 8/1962 | Great Britain. |
| 795,378 | 5/1958 | Great Britain. |
| 777,621 | 6/1957 | Great Britain. |
| 518,057 | 4/1940 | Great Britain. |

DONALD E. CZAJA, Primary Examiner

C. W. IVY, Assistant Examiner

U.S. Cl. X.R.

260—28, 37, 47, 78.4, 830

UNITED STATES PATENT OFFICE
CERTIFICATE OF CORRECTION

Patent No. 3,484,398                      December 16, 1969

William I. Childs

It is certified that error appears in the above identified patent and that said Letters Patent are hereby corrected as shown below:

Column 8, line 65, "continue" should read -- contain --. Column 13, line 30, after "component" insert a comma; line 31, "components" should read -- component --; line 48, "suspension" should read -- fused solid mixture --; lines 51 and 52, "A particulate epoxy resin composition according to claim 1, in which" should read -- A particulate epoxy resin coating composition according to claim 1 or 2, in which --. Column 14, lines 2, 6, 11, 16, 22, and 26, "claim 1", each occurrence, should read -- claim 1 or 2 --.

Signed and sealed this 16th day of June 1970.

(SEAL)
Attest:

Edward M. Fletcher, Jr.                      WILLIAM E. SCHUYLER, JR.
Attesting Officer                              Commissioner of Patents